United States Patent
Muthuvaradharajan (10) Patent No.: US 10,013,751 B2
(45) Date of Patent: Jul. 3, 2018

(54) SYSTEM AND METHOD FOR DYNAMICALLY DETERMINING BALANCE SHELF LIFE OF AN INDUSTRIAL COMPONENT

(71) Applicant: Wipro Limited, Bangalore (IN)

(72) Inventor: Chandramohan Muthuvaradharajan, Hosur (IN)

(73) Assignee: Wipro Limited, Bangalore (IN)

( * ) Notice: Subject to any disclaimer, the term of this patent is extended or adjusted under 35 U.S.C. 154(b) by 66 days.

(21) Appl. No.: 15/269,460

(22) Filed: Sep. 19, 2016

(65) Prior Publication Data

US 2018/0033134 A1   Feb. 1, 2018

(30) Foreign Application Priority Data

Jul. 29, 2016   (IN) .............................. 201641026109

(51) Int. Cl.
  *G06T 17/00*   (2006.01)
  *G06K 9/62*    (2006.01)
  *G06T 7/00*    (2017.01)

(52) U.S. Cl.
  CPC .. *G06T 7/0004* (2013.01); *G06T 2207/10004* (2013.01)

(58) Field of Classification Search
  CPC ........ G06T 7/0004–7/001; G06T 2207/30164; G05B 19/4065; G05B 2219/37256
  See application file for complete search history.

(56) References Cited

U.S. PATENT DOCUMENTS

2011/0054806 A1*  3/2011 Goldfine ................. G07C 3/00
                                                    702/34
2017/0057039 A1*  3/2017 Nakayama ......... B23Q 17/0904

OTHER PUBLICATIONS

Yongjin Kwon et al., "A novel approach to quantifying tool wear and tool life measurements for optimal tool management", International Journal of Machine Tools & Manufacture 43 (2003), pp. 359-368. (Year: 2003).*

* cited by examiner

*Primary Examiner* — Brian P Werner
(74) *Attorney, Agent, or Firm* — LeClairRyan PLLC (57) ABSTRACT

This disclosure relates to dynamically determining balance shelf life of an industrial component including analyzing a plurality of images of the industrial component to detect a plurality of defects in the industrial component, and determining an overall impact of the plurality of defects on the shelf life of the industrial component based on at least one of a type of each of the plurality of defects, an extent of each of the plurality of defects with respect to the industrial component, an attribute of the industrial component, an attribute of a working component, and an operational usage of the industrial component. The balance shelf life of the industrial component is dynamically determined based on an initial expected life of the industrial component and the overall impact of the plurality of defects on the shelf life of the industrial component.

15 Claims, 4 Drawing Sheets

FIG. 6

SYSTEM AND METHOD FOR DYNAMICALLY DETERMINING BALANCE SHELF LIFE OF AN INDUSTRIAL COMPONENT

This application claims the benefit of Indian Patent Application Serial No. 201641026109, filed Jul. 29, 2016, which is hereby incorporated by reference in its entirety.

FIELD

This disclosure relates generally to inspection of an industrial component, and more particularly to system and method for dynamically determining balance shelf life of the industrial component.

BACKGROUND

A variety of industrial components or industrial tools are typically employed to perform a variety of engineering operations such as cutting, pressing, punching, forming, blanking, shearing, and so forth. An expected shelf life of the component is a number of usage cycles the component can sustain before the component fails and is generally known. However, the industrial components may develop certain defects or deformities with usage over time or for various other reasons (e.g., mishandling, usage conditions, etc.). These defects may result in a failure of the industrial component before its expected shelf life which in turn may result in sudden disruption in the industrial processes and a drop in production efficiency (e.g., drop in production output, longer production cycle, etc.). It is therefore important to carry out an accurate monitoring and dynamic determination of the shelf life of such industrial component so that necessary alterations in the planning are made to compensate for the reduction in the balance life of the component.

However, shelf life characteristics of an industrial component or a tool that directly or indirectly produces a product are complex as they involve not only determining remaining shelf life of the industrial component but also tracking of its co-ordinates. Typically, the shelf life of the industrial component and its coordinates are monitored manually and is a challenge due to complexity of the business processes. Although, various devices may be employed for detecting defects or deformities, but the process of correlating and determination of the remaining shelf life is generally a manual procedure. As such, the process involves effort to manually record information in real-time and is therefore complicated, tedious, prone to manual errors, and time consuming. Existing techniques therefore do not provide an effective way of determining shelf life characteristics.

SUMMARY

In one embodiment, a method for determining a balance shelf life of an industrial component is disclosed. In one example, the method comprises analyzing a plurality of images of the industrial component to detect a plurality of defects in the industrial component. The method further comprises determining an overall impact of the plurality of defects on the shelf life of the industrial component based on at least one of a type of each of the plurality of defects, an extent of each of the plurality of defects with respect to the industrial component, an attribute of the industrial component, an attribute of a working component, and an operational usage of the industrial component. The method further comprises dynamically determining the balance shelf life of the industrial component based on an initial expected life of the industrial component and the overall impact of the plurality of defects on the shelf life of the industrial component.

In one embodiment, a shelf life measurement system for determining a balance shelf life of an industrial component is disclosed. In one example, the system comprises at least one processor and a memory communicatively coupled to the at least one processor. The memory stores processor-executable instructions, which, on execution, cause the processor to analyze a plurality of images of the industrial component to detect a plurality of defects in the industrial component. The processor-executable instructions, on execution, further cause the processor to determine an overall impact of the plurality of defects on the shelf life of the industrial component based on at least one of a type of each of the plurality of defects, an extent of each of the plurality of defects with respect to the industrial component, an attribute of the industrial component, an attribute of a working component, and an operational usage of the industrial component. The processor-executable instructions, on execution, further cause the processor to dynamically determine the balance shelf life of the industrial component based on an initial expected life of the industrial component and the overall impact of the plurality of defects on the shelf life of the industrial component.

In one embodiment, a non-transitory computer-readable medium storing computer-executable instructions for determining a balance shelf life of an industrial component is disclosed. In one example, the stored instructions, when executed by a processor, cause the processor to perform operations comprising analyzing a plurality of images of the industrial component to detect a plurality of defects in the industrial component. The operations further comprise determining an overall impact of the plurality of defects on the shelf life of the industrial component based on at least one of a type of each of the plurality of defects, an extent of each of the plurality of defects with respect to the industrial component, an attribute of the industrial component, an attribute of a working component, and an operational usage of the industrial component. In response to the need, the operations further comprise dynamically determining the balance shelf life of the industrial component based on an initial expected life of the industrial component and the overall impact of the plurality of defects on the shelf life of the industrial component.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
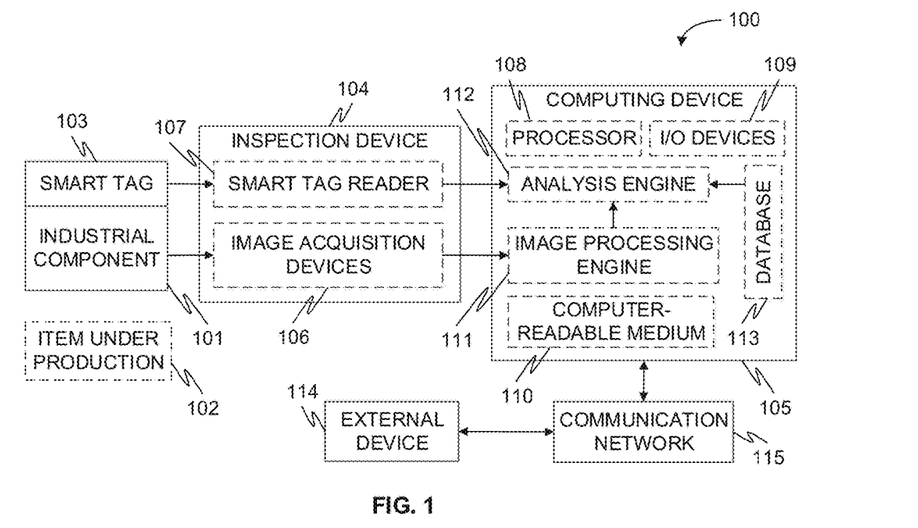
FIG. 1 is a block diagram of an exemplary shelf life measurement system for dynamically determining balance shelf life of an industrial component in accordance with some embodiments of the present disclosure.

Referring now to FIG. 1, an exemplary shelf life measurement system 100 for dynamically determining balance shelf life of an industrial component is illustrated in accordance with some embodiments of the present disclosure. The system 100 may be employed in an industrial facility such as in a rectification area or a shop floor. Further the system 100 may be employed to determine balance shelf life of either a virgin industrial component or an industrial component which has previously been used for carrying out an industrial operation.

As discussed above, the industrial component or tool 101 is employed in an industrial process to produce various items 102. For example, the industrial component 101 may be a press tool such as a piercing tool, a blanking tool (punch and die), a bending tool (punch and die), a forming tool (punch and die), a forging tool (punch and die), etc. that may be employed for producing pressed items. The produced item 102 are finished industrial goods (either intermediary or final products) such as watch cases, crank shafts, automobile components (e.g., hood, fender), and so forth. A smart tag 103 may be disposed within or on the industrial component 101 to track the location or position of the industrial component. In some embodiments, the smart tag 103 may include, but is not limited to, a RFID tag, a barcode, and a beacon.

The system 100 comprises an inspection device 104 in communication with a shelf life analysis computing device 105. The system 100 inspects the condition of the industrial component 101 as well as tracks the industrial component 101 using the inspection device 104. The system 100 further determines the remaining or balance shelf life of the industrial component 101 along with its location or position during the production lifecycle using the computing device 105 based on the information acquired by the inspection device 104.

The inspection device 104 may include image acquisition devices 106 that may acquire both external and internal images of the industrial component. For example, in some embodiments, the external images may be acquired using any optical imaging devices such as a microscope. Similarly, in some embodiments, the internal images may be acquired using any non-destructive imaging devices such as an ultrasonic imaging device (e.g., phasor array imaging). The acquired images may then be processed and analyzed by the computing device 105 to determine the remaining shelf life of the industrial component 101. The inspection device 104 may also include a smart tag reader 107 that detects the smart tag 103. For example, in some embodiments, the smart tag reader 107 may include a RFID reader or a beacon reader to detect signals from a RFID tag or a beacon. Alternatively, the smart tag reader 107 may include a barcode scanner to read a barcode. The acquired data may then be analyzed by the computing device 105 to track the position and movement of the industrial component 101. For example, in some embodiments, the computing device 105 may capture the coordinates or locations of the particular entry/exit point within the area that has been activated (i.e., smart tag reader 107 has detected the smart tag 103). It should be noted that, in some embodiments, the smart tag reader 107 may be a part of the computing device 105 instead of the inspection device 104.

The computing device 105 comprises one or more processors 108, input/output devices 109 (e.g., keyboard, touchpad, touchscreen, display, etc.), and a computer-readable medium 110. The computer-readable storage medium 110 stores instructions that, when executed by the one or more processors 108, cause the one or more processors 108 to analyse data so as to track the industrial component and to dynamically determine balance shelf life of the industrial component in accordance with aspects of the present disclosure. For example, the images acquired by the image acquisition devices 106 may be processed by an image processing engine 111 to detect any defects in the industrial component 101 and/or to determine an extent or a location of each of the identified defects. Further, an analysis engine 112 may receive data from the image processing engine 111 to dynamically determine balance shelf life of the industrial component. The analysis engine 112 may also receive data from the smart tag reader 107 to determine location of the industrial component. The analysis engine 112 may refer to one or more databases 113 to perform its operation. The computer-readable storage medium 110 may also store various data (e.g., image data, smart tag reader data, statistical data, location coordinates, etc.) that may be captured, processed, and/or required by the computing device 105 or the system 100 in the one or more databases 113. Further, the computing device 105 may interact with the one or more users via a user interface using one or more I/O devices 109.

It should be noted that, in some embodiments, the computing device 105 may be a portable or hand-held computing devices such as tablet computers (e.g., Apple iPad, Android-based tablets, Window-based tablets, etc.), notebooks, smartphones (e.g., Apple iPhone, Blackberry, Android-based phones, Window-based phones, etc.), and so forth. The computing device 105 may therefore be adapted to download and execute a software application that is configured to determine remaining shelf life of the industrial component as well as configured to track its co-ordinates. Further, the computing device 105 may be adapted to execute any business or process transactions or activities (e.g., inventory movement, document postings, location recording, etc.) using any ERP software application (e.g., SAP, Oracle, Baan, Axapta, Navision, Microsoft Dynamics Great Plains, etc.).

Further, it should be noted that the engines 111 and 112 may be implemented in programmable hardware devices such as programmable gate arrays, programmable array logic, programmable logic devices, and so forth. Alternatively, the engines 111 and 112 may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

The computing device 105 or the system 100 may also interact with one or more external devices 114 over a communication network 115 for sending or receiving various data. The external devices 114 may include, but are not limited to, remote servers, computers, mobile devices, another systems or devices (e.g., other similar system) located locally or remotely with respect to the system 100. The communication network 115 may be any wired or wireless communication network.

Figure 2:
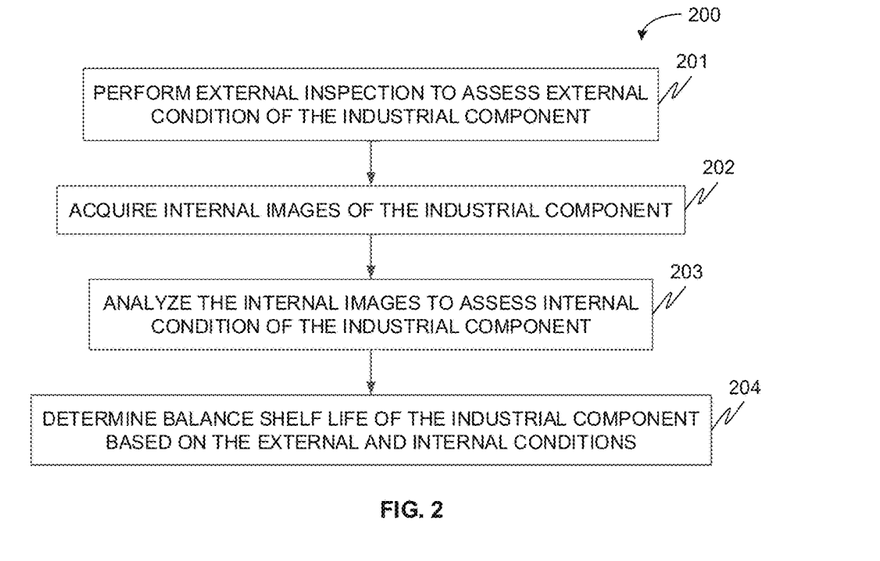
FIG. 2 is a flow diagram of an exemplary process overview for dynamically determining balance shelf life of an industrial component in accordance with some embodiments of the present disclosure.

Referring now to FIG. 2, an overview of an exemplary process 200 for dynamically determining balance shelf life of an industrial component is depicted via a flowchart in accordance with some embodiments of the present disclosure. The process 200 involves the steps of performing external inspection to assess external condition of the industrial component at step 201, acquiring internal images of the industrial component at step 202, analyzing the internal images to assess internal condition of the industrial component at step 203, and determining balance shelf life of the industrial component based on the external and the internal conditions at step 204. Each of these steps will be described in greater detail herein below.

The system 100 is first initialized and the inspection device 104 performs inspection of the industrial component 101. At step 201, the industrial component 101 (e.g., punches, die set, etc.) are first checked for any external damages by the inspection device 104. In some embodiments, this may be achieved by performing microscopic inspection of the external surfaces of the industrial component 101 and assessing external condition of the industrial component based on the inspection. Alternatively, in some embodiments, one or more images of the external surfaces of the industrial component 101 may be acquired by employing the image acquisition device 106. It should be noted that the image acquisition device 106 for acquiring external images may be any optical (i.e., lens-based) imaging device such as microscopic imaging device. The external images may then be processed by the image processing engine 111 and the processed images may be subsequently analyzed by the analysis engine 112 to assess external condition of the industrial component. It should be noted that the external damages or defects may be any external wear and tear such as chipping, deformation, bluntness, and so forth. Further, it should be noted that the assessment may comprises determination of a magnitude or an extent of external damages based on at least one of a size of damage, a location of the damage, a length of the damage, a degree of bluntness, and so forth.

At step 202, the industrial component 101 is inspected for any internal damages by the inspection device 104. Since, the industrial components 101 may be subjected to repeated impact loading or cyclic loading their initial nano-cracks or micro-cracks propagate to become bigger in sizes and may cause premature failures (i.e., failure before their expected life). Thus, after microscope inspection of the external surface, the industrial component 101 is inspected for any internal damages or defects (e.g., internal cracks) by the inspection device 104. In some embodiments, this may be achieved by acquiring internal images of the industrial component 101 by employing the image acquisition device 106. It should be noted that the image acquisition device 106 for acquiring internal images may be an ultrasonic imaging device, or any other imaging system capable of imaging the internal structure of the industrial component 101. In some embodiments, the image acquisition device 106 for acquiring internal images may be an ultrasonic phased-array imaging device in which a multi-element array transducer is employed to generate a sweeping beam that can examine a component from a number of different angles and focal points so as to create a detailed image of internal structure of the component. Any changes in the internal structure of the component, such as an internal crack, will change the pattern of beam reflection in predictable ways. Thus, the internal images not only enable detection of any internal defects but also enable in determination of a position or coordinates of the internal defects.

At step 203, the internal images are processed by the image processing engine 111 to detect the internal defects (i.e., internal cracks). The processed images are subsequently analyzed by the analysis engine 112 to assess internal condition of the industrial component. It should be noted that the assessment may comprises determination of a magnitude or an extent of internal defects based on at least one of a number of internal cracks, an area encompassing some or all of the internal cracks, a shape of each of the internal cracks, a size of each of the internal cracks, and a location of each of the internal cracks within the industrial component, and so forth. In some embodiments, the analysis engine 112 maps or correlates the internal images with a three-dimensional model (e.g., a 3-D CAD model) of the industrial component 101 so as to determine the number, the shape, size, location, and area of the internal cracks. As will be appreciated by those skilled in the art, the three-dimensional model of the industrial component 101 is stored in the database 113. Thus, the processed internal images are translated in the same dimensions or coordinates as that of the industrial component, and locations or coordinates of each of the internal cracks are determined therefrom. In some embodiments, the center axis of each of the images and the three-dimensional model is aligned so as to perform mapping.

Figure 3:
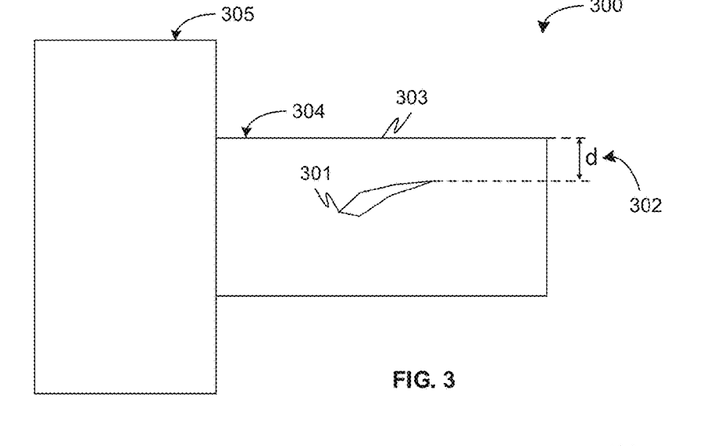
FIG. 3 is a cross-section view of an industrial component along with an internal crack in accordance with some embodiments of the present disclosure.

In some embodiments, a shortest distance is determined between an external surface of the industrial component and an internal defect closest to the external surface based on the mapping. Referring now to FIG. 3, a cross-section view 300 of an industrial component 101 along with an internal crack 301 is illustrated in accordance with some embodiments of the present disclosure. As illustrated in FIG. 3, an exemplary shortest distance 'd' 302 is a distance between an end point of the internal crack 301 and an external surface 303 of the industrial component 101. It should be noted that, the analysis engine 112 assess each of the internal cracks present in the industrial component 101, and selects the crack closest to one of the external surfaces of the industrial component 101 for determining the shortest distance 'd'. Further, it should be noted that, in some embodiments, the surface of the industrial component is modeled around the internal cracks so as to determine the distance 'd'. The information about the shortest distance 'd' is stored in the database for further processing. Further, in the illustrated exemplary embodiment of the industrial component, the length of horizontal part 304 (e.g., punch) of the industrial component few inches away from the vertical part 305 (e.g., shank or punch holder) is known as overhang. Similarly, the width of horizontal part 304 (e.g., punch) of the industrial component is size of the industrial component. Additionally, it should be noted that, in some embodiments, overhang is in a specific ratio with the diameter of the industrial component.

As will be appreciated by those skilled in the art, the shelf life of a virgin or an unused industrial component is typically pre-assumed or pre-determined based on multiple tests, parameters, assumptions, and historical observations. The shelf life may be typically measured in terms of known number of operational uses of the industrial component before its eventual failure or discarding. For example, the shelf life of a punch or die may be defined in terms of number of shots (e.g., 100,000 shots) the punch can successfully perform before failing. However, the shelf life of the industrial component may not turn out to be same as the pre-determined value and the component may fail before the pre-determined shelf life due to development of defects in the component. The defects may either develop at the stage of manufacturing of the component or may develop over a period of time due to usage of the component. As stated above, the defects may be external defects formed on external surfaces of the industrial component or internal defects formed within the internal structure of the industrial component. It is therefore desirable to identify each of such defects and revise the balance shelf life of the industrial component for proper planning of the inventory and uninterrupted manufacturing operations.

At step 204, the analysis engine 112 determines an overall impact of the plurality of defects on the shelf life of the industrial component based on the external and the internal conditions. It should be noted that, in some embodiments, the overall impact of the plurality of defects on the shelf life of the industrial component is determined based on at least one of a type of each of the plurality of defects, an extent of each of the plurality of defects with respect to the industrial component, an attribute of the industrial component, an attribute of a working component, and an operational usage of the industrial component. In some embodiments, the overall impact may be determined by determining a weighted impact of each of the plurality of defects on the shelf life of the industrial component. Further, in some embodiments, the overall impact may be determined by determining a weighted impact of each type of defects on the shelf life of the industrial component.

As discussed above, the type of defect includes an external defect or an internal defect. The extent of external defect includes at least one of a size of defect, a location of the defect, a length of the defect (e.g., length measured from top of the punch surface), a degree of bluntness, and so forth. Similarly, the extent of internal defects includes at least one of a number of internal defects, an area encompassing some or all of the internal defects, a shape of each of the internal defects, a size of each of the internal defects, and a location of each of the internal defects within the industrial component (e.g., shortest distance of an internal defect from an external surface of the industrial component), and so forth. In some embodiments, the weighted impact of a plurality of internal defects is determined based on the number of internal defects between the centerline of the industrial component and the internal defect closest to the external surface and an area encompassing such internal defects.

Further, the analysis engine 112 retrieves information about attributes of the industrial component, attributes of the working component, and the operational usage of the industrial component from the database 113. Alternatively, the analysis engine 112 may receive such information from the user via the user interface. In some embodiments, the attribute of the industrial component includes at least one of an overhang, a size of the industrial component (e.g., punch diameter, greatest width for non-circular shapes, etc.), a material of the industrial component, a hardness of the industrial component, a heat treatment process of the industrial component such as a hardening process (e.g., vacuum hardened, quench hardened, etc.), and so forth. Similarly, the attribute of the working component includes at least one of a material of the working component, a thickness of the working component, a hardness of the working component, a hardening or stress relieving process of the working component, and so forth. The operational usage of the industrial component includes at least one of pressing, punching, cutting, bending, piercing, forming, blanking, forging, and so forth. It may be noted that, in some embodiments, a greater hardness or a greater overhang of the industrial component may entail a lesser weighted impact on the shelf life of the industrial component. Similarly, in some embodiments, a greater hardness or a greater thickness of a working component may entail a greater weighted impact on the shelf life of the industrial component.

The analysis engine 112 may receive a data comprising calibrated weighted impact values corresponding to different magnitudes for various attributes of the defects, attributes of industrial component, and attributes of working component. The analysis engine 112 may then select a weighted impact value corresponding to current magnitude of each attribute related to the defect, industrial component, working component, and the operational usage. By collating the various weighted impact values, the analysis engine 112 determines the overall impact value of the plurality of defects on the shelf life of the industrial component. In some embodiments, the weighted impact values are in form of a number of operational uses of the industrial component. The overall impact value signifies total number of operational uses with respect to the industrial component that needs to be adjusted against the initial expected life of the industrial component.

The analysis engine 112 then determines balance shelf life of the industrial component based on an initial expected life of the industrial component and the overall impact of the plurality of defects on the shelf life of the industrial component. In some embodiments, the balance shelf life of the industrial component is determined by subtracting the overall impact from the initial shelf life. It should be noted that the initial expected life is determined based on a virgin life of the industrial component and a past number of operational uses of the industrial component. In some embodiments, the initial shelf life of the industrial component is determined by subtracting the past number of operational uses from the virgin shelf life. The balance shelf life of the industrial component therefore signifies a revised shelf life of the industrial component 101. The virgin shelf life of the component may be stored in the database or may be provided by the user. Similarly, the past number of operational uses of the industrial component may be stored in the database or may be provided by the user. Alternatively, in some embodiments, the smart tag 103 may carry information about virgin shelf life as well as past number of operational usage of the industrial component. This information may then be retrieved by the smart tag reader and provided to the analysis engine 113 for subsequent processing. For example, the smart tag 103 may store information about the movement of the industrial component through various operational processes as well as a past number of operational uses that the industrial component has been subjected through. This information may be updated in the smart tag 103 via the smart tag reader after each stage of the industrial process.

By way of example, in certain embodiments, a sample illustration of magnitude of various attributes of internal defect, industrial component, and working component and a corresponding impact on the shelf life of the industrial component is provided in following table:

TABLE A

| Shortest Distance (d) of an Internal Defect form an External Surface | Material and Hardness of the industrial component (punch) in Hardness Vickers (HV) | Working component Material | Overhang | Impact on the Shelf Life (Number of Shots – Example Value) |
|---|---|---|---|---|
| 8 mm | 700 HV | Brass | 25 mm | 40000 |
| 10 mm | 700 HV | Brass | 25 mm | 30000 |
| 12 mm | 720 HV | Stainless steel | 25 mm | 35000 |

The above table provides an impact value on the shelf life of an industrial component based on the shortest distance of an internal defect from an external surface of the industrial component, the material and hardness of the industrial component, the material of the working component, and an overhang of the industrial component. The impact value is provided in terms of number of shots or number of usage. It should be noted that, in some embodiments, the impact value provided in the above table may be pre-determined based on calculation as well as historical and statistical observation and stored in the database for subsequent reference by the analysis engine. As discussed above, the balance shelf life of the industrial component having just one internal defect may be determined by subtracting a weighted impact value obtained from the above table from the initial shelf life of the industrial component. However, if there are external defects and/or multiple internal defects then an overall impact on the shelf life needs to be determined by determining a weighted impact of each type of defects on the shelf life of the industrial component.

By way of example, in certain embodiments, a sample illustration of determining balance shelf life of an industrial component during various stages of the industrial process while factoring weighted impact of various types of defects on the shelf life of the industrial component is provided in following table:

TABLE B

| Status | Remaining Shelf Life | Weighted Impact (Weightage factor * determined number of shots) | Remarks |
|---|---|---|---|
| Storage | "X" = 80000 shots | | Virgin industrial component (shelf life as decided by expert or component provider). |
| Issued for production | "X" = 80000 shots | | RFID tag captures the co-ordinate movement to production |
| Produces 10000 products of a batch | "X" = 80000 – N = 70000 shots (as N = 10000 shots) | N | N is the number of shots used |
| Storage Rectification area and External defects determination using microscopic inspection | "X" = 70000 shots Scenario 1: No external defects, shelf Life "X" = 70000 shots Scenario 2: "X" = 70000 – Wr*Lr = 60000 shots (if Wr*Lr = 10000 shots) | Wr*Lr Lr is length to the extent the rectification is to be carried out and corresponds to impact of external defects on shelf life Wr is the weightage factor for length of rectification Lr | RFID tag captures the co-ordinate movement to rectification. Performed after the optical imaging or microscopic inspection. Lr is based on extent of external defects and may be determined, for example, using historical and statistical value. Wr may be determined, for example, based on current working length of punch with respect to the whole. |
| Internal defects determination using ultrasonic phase array imaging | "X" = 60000 shots | | |
| Internal defects determined | Scenario 1: No internal defect, shelf Life "X" = 60000 shots Scenario 2: One internal crack at a specific distance 'd', then the remaining life depends on shortest distance 'd' from outer surface of the punch. Hence, for a distance 'd' | Wd*Sd (if one internal defect) Sd corresponds to impact of internal defects on the shelf life Wd is weightage factor for Sd Also, Wn*Cn (if multiple internal defects - this is | Sd is based on the shortest distance 'd' and may be determined, for example, from Table A. Wd may be determined, for example, based on distance from central line or external surface. If a defect is closer to the external surface, weightage is high and |

TABLE B-continued

| Status | Remaining Shelf Life | Weighted Impact (Weightage factor * determined number of shots) | Remarks |
|---|---|---|---|
| | X = 60000 − Wd*Sd = 40000 (if Wd*Sd = 20000). Also, if multiple internal cracks are determined between center line of the punch and the internal crack that has been identified as closest to the surface in the previous step X = 40,000 − Wn*Cn = 30000 (if Wn*Cn = 10000). Also, may be signaled for anytime breakable or fatal end. | additional to Wd*Sd) Cn corresponds to impact of multiple internal defects on the shelf life Wn is weightage factor for Cn | more life is to be deducted. However, if the defect is farther from the external surface, weightage is low and less life is to be deducted. Cn is some percentage of total life value with respect all the cracks based on attributes of industrial component and working component and may be determined, for example, using historical and statistical value. Wn may be determined, for example, based on proportion of area of combined cracks (i.e., closest polygon concurrent to punch shape) with respect to the total area of punch. |

Thus, the remaining shelf life may be computed as:
$Xn = Xn-1 − N − Wr*Lr − Wd*Sd − Wn*Cn$
where $Xn-1$ is the initial shelf life of the industrial component, and where $X0$ is the virgin shelf life of the industrial component.

The above table provides an overall impact value on the shelf life of an industrial component based on weighted impact value of each type of defects on the shelf life of the industrial component. Initially, the industrial component is in virgin condition while in the storage. In the given example, the balance shelf life at this stage is 80,000 shots. As explained earlier, the shelf life of the virgin industrial component may be determined based on multiple test, parameters, assumptions, and statistical observation of the behavior of the industrial component when put to use in industrial operations. In the next stage, the industrial component is issued for industrial operation for production of a batch of 10,000 products. As the component is put to use for 10,000 shots, the balance shelf life is reduced to 70,000 shots at this stage. In the next stage, the punch passes to the rectification area where the punch is inspected for external defects which includes determining length to the extent the rectification is to be carried out. A weighted impact Wr*Lr due to the extent of external defects such as degree of bluntness or changes in the current working length of the punch may be determined. In the given example, the Wr*Lr is calculated to be 10,000 shots. The balance shelf life at the end of this stage is therefore 60,000 shots. In the successive stage, the industrial component is subjected to inspection for determination of internal defects and a weighted impact due to the internal defects may be determined. At this stage, firstly, a shortest distance 'd' of an internal defect form the external surface is calculated and the accordingly a corresponding weighted impact Wd*Sd is determined. In the given example, the weighted impact Wd*Sd is calculated to be 20,000 shots, and thus the balance shelf life at this stage is 40,000 shots. Secondly, if multiple internal cracks are determined between center line of the punch and the internal crack that has been identified as closest to the surface, a corresponding weighted impact Wn*Cn may be determined. In the given example, Wn*cn is calculated to be 10,000 shots, and therefore, the balance shelf life at this stage is 30,000 shots. The analysis engine executes an algorithm which determines the remaining shelf life based on the distance from internal damages/cracks to the weaker zones. It should be noted that, in some embodiments, the weighted impact Wr*Lr or Wd*Sd or Wn*Cn on the shelf life of the component may be determined based on calculation. Alternatively, the weighted impact Wr*Lr or Wd*Sd or Wn*Cn may be based on historical and statistical observation that is stored in the database for reference. Further, it should be noted that, in some embodiments, weightage factor may be established with respect to each individual of them and may be designated as Wd>Wn>Wr.

As will be appreciated by one skilled in the art, a variety of processes may be employed for dynamically determining balance shelf life of the industrial component. For example, the exemplary system 100 may dynamically determine balance shelf life of the industrial component by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 4:
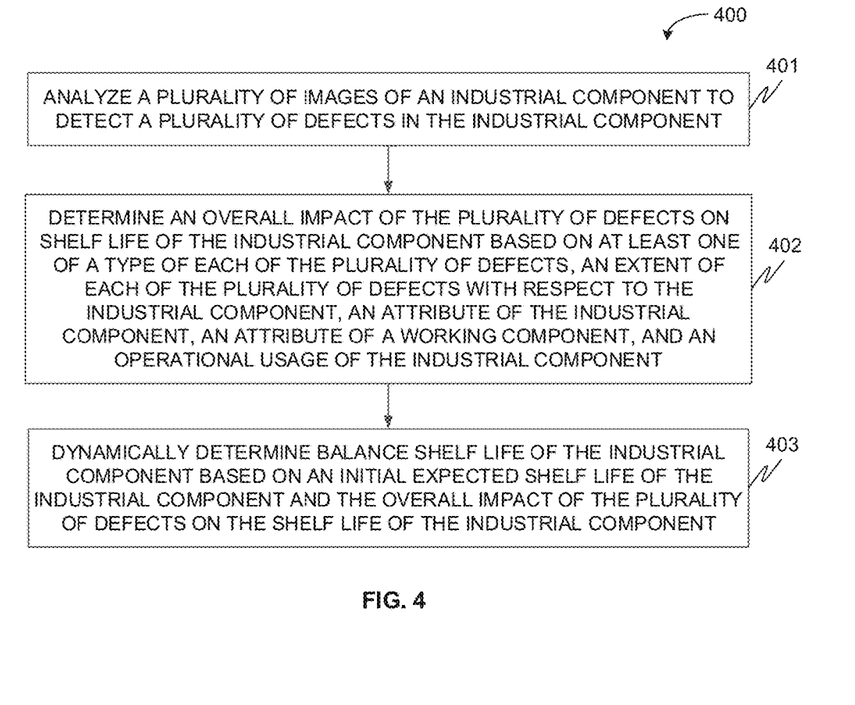
FIG. 4 is a flow diagram of an exemplary process for dynamically determining balance shelf life of an industrial component and in accordance with some embodiments of the present disclosure.

For example, referring now to FIG. 4, exemplary control logic 400 for dynamically determining a balance shelf life of an industrial component via a system, such as system 100, is depicted via a flowchart in accordance with some embodiments of the present disclosure. As illustrated in the flowchart, the control logic 400 includes the step of analyzing a plurality of images of the industrial component to detect a plurality of defects in the industrial component at step 401. The control logic 400 further includes the step of determining an overall impact of the plurality of defects on the shelf life of the industrial component based on at least one of a type of each of the plurality of defects, an extent of each of the plurality of defects with respect to the industrial component, an attribute of the industrial component, an attribute of a working component, and an operational usage of the industrial component at step 402. The control logic 400 further includes the step of dynamically determining the balance shelf life of the industrial component based on an initial expected life of the industrial component and the overall impact of the plurality of defects on the shelf life of the industrial component at step 403. It should be noted that, in some embodiments, the initial expected life is determined based on a virgin life of the industrial component and a number of operational uses of the industrial component. In some embodiments, the control logic 400 further includes the step of acquiring the plurality of images of at least one of an external surface of the industrial component and an internal structure of the industrial component. Additionally, in some embodiments, the control logic 400 further includes the step of tracking the industrial component during a production lifecycle using a RFID tag.

In some embodiments, analyzing at step 401 comprises inspecting or processing the plurality of images to determine at least one of the type and the extent of each of the plurality of defects. It should be noted that the type of defect comprises at least one of an external defect and an internal defect. Further, in some embodiments, determining the overall impact at step 402 comprises determining a weighted impact of each of the plurality of defects on the shelf life of the industrial component. It should be noted that, when at least some of the plurality of defects comprises external defects, determining the overall impact at step 402 comprises determining a weighted impact of the external defects based on an extent of external defects with respect to the industrial component, a size of the industrial component, and the operational usage of the industrial component.

Further, it should be noted that, when at least some of the plurality of defects comprises internal defects, determining the overall impact at step 402 comprises determining a weighted impact of the internal defects based on at least one of an extent of internal defects with respect to the industrial component, the attribute of the industrial component, the attribute of the working component, and the operational usage of the industrial component. Additionally, determining the weighted impact of the internal defects comprises mapping a set of the plurality of images of an internal structure of the industrial component with a three-dimensional model of the industrial component, determining a shortest distance between an external surface of the industrial component and an internal defect closest to the external surface based on the mapping, and determining the weighted impact of the internal defect closest to the external surface based on the shortest distance, a material of the industrial component, a size of the industrial component, a hardness of the industrial component, a material of the working component, and a hardness of the working component. Moreover, determining the weighted impact of the internal defects comprises determining a number of internal defects between the centerline of the industrial component and the internal defect closest to the external surface, determining an area encompassing the number of internal defects, and determining the weighted impact of the internal defects based on the number, the area, a material of the industrial component, a size of the industrial component, a hardness of the industrial component, a material of the working component, and a hardness of the working component.

Figure 5:
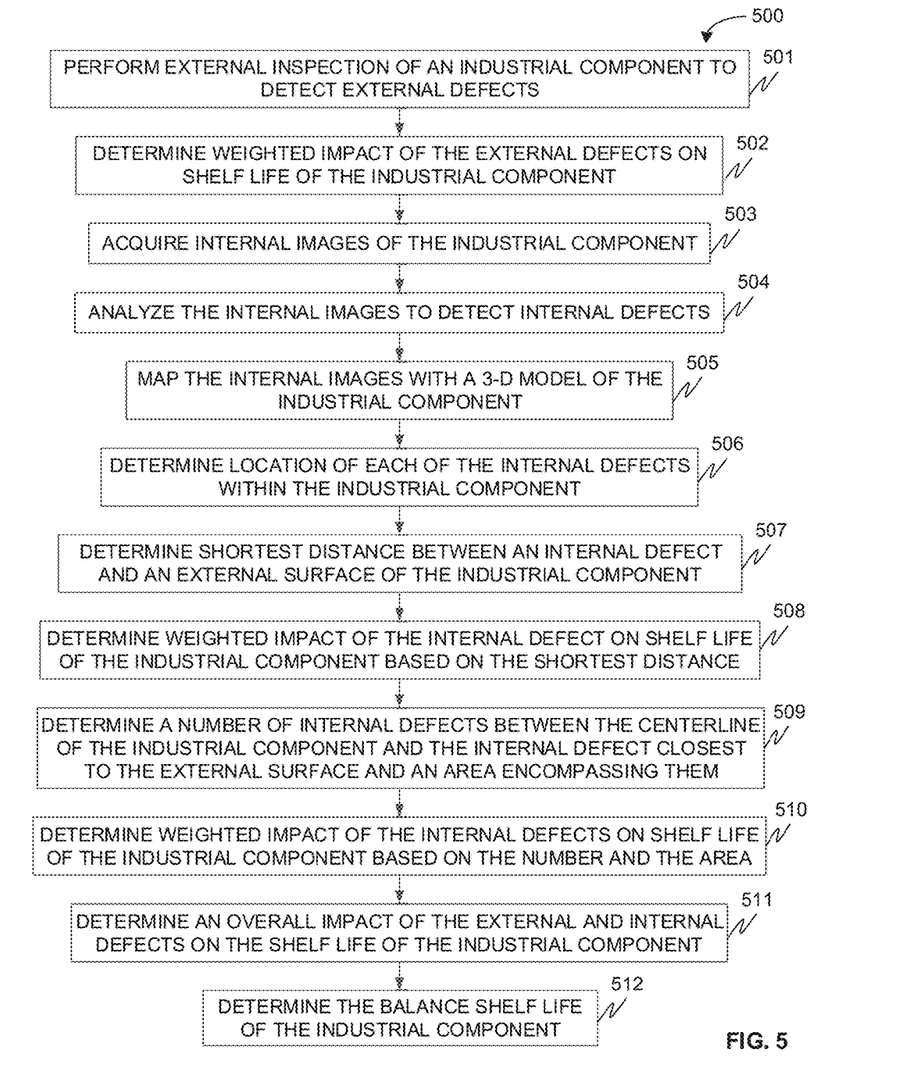
FIG. 5 is a flow diagram of a detailed exemplary process for dynamically determining balance shelf life of an industrial component in accordance with some embodiments of the present disclosure.

Referring now to FIG. 5, exemplary control logic 500 for dynamically determining a balance shelf life of an industrial component is depicted in greater detail via a flowchart in accordance with some embodiments of the present disclosure. As illustrated in the flowchart, the control logic 500 includes the steps of performing external inspection of the industrial component to detect external defects at step 501 and determining weighted impact of the external defects on shelf life of the industrial component at step 502. As discussed above, the external inspection of the industrial component is performed by performing microscopic inspection or acquiring images of external surfaces of the industrial component. Further, the weighted impact of the external defects may be determined based on extent of external defects.

The control logic 500 further includes the steps of acquiring images of internal structure of the industrial component at step 503, and analyzing the internal images to detect internal defects at step 504. As discussed above, the internal images are acquired by ultrasonic imaging device using phased array ultrasonic imaging technique. The internal images are then processed and analyzed to detect one or more internal defects in the industrial component. The control logic 500 further includes the steps of mapping the internal images with a three-dimensional model of the industrial component at step 505, and determining location or coordinates of each of the internal defects within the industrial component based on the mapping at step 506. Further, the control logic 500 includes the step of determining a shortest distance between an external surface of the industrial component and an internal defect closest to the external surface based on the mapping at step 507. As will be appreciated by those skilled in the art, the step 507 involves identifying the internal defect closest to the external surface from the mapping. The control logic 500 further includes the step of determining weighted impact of the closest internal defect on shelf life of the industrial component based on the shortest distance at step 508. As discussed above, the weighted impact of the internal defect may be further determined based on other attributes of industrial component and the working component.

The control logic 500 further includes the steps of determining a number of internal defects between the centerline of the industrial component and the internal defect closest to the external surface and an area encompassing them at step 509, and determining weighted impact of the internal defects on shelf life of the industrial component based on the number and the area at step 510. Further, the control logic 500 includes the step of determining an overall impact of the external and internal defects on the shelf life of the industrial component at step 511. The overall impact is determined based on each of the weighted impacts determined at steps 502, 508, and 510. Finally, the control logic 500 includes the step of determining the balance shelf life of the industrial component at step 512. The balance shelf life is determined based on the initial expected shelf life of the industrial component and the overall impact determined at step 511.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing this technology. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing this technology. When implemented on a general-purpose microprocessor, the computer program code segments configure the microprocessor to create specific logic circuits.

Figure 6:
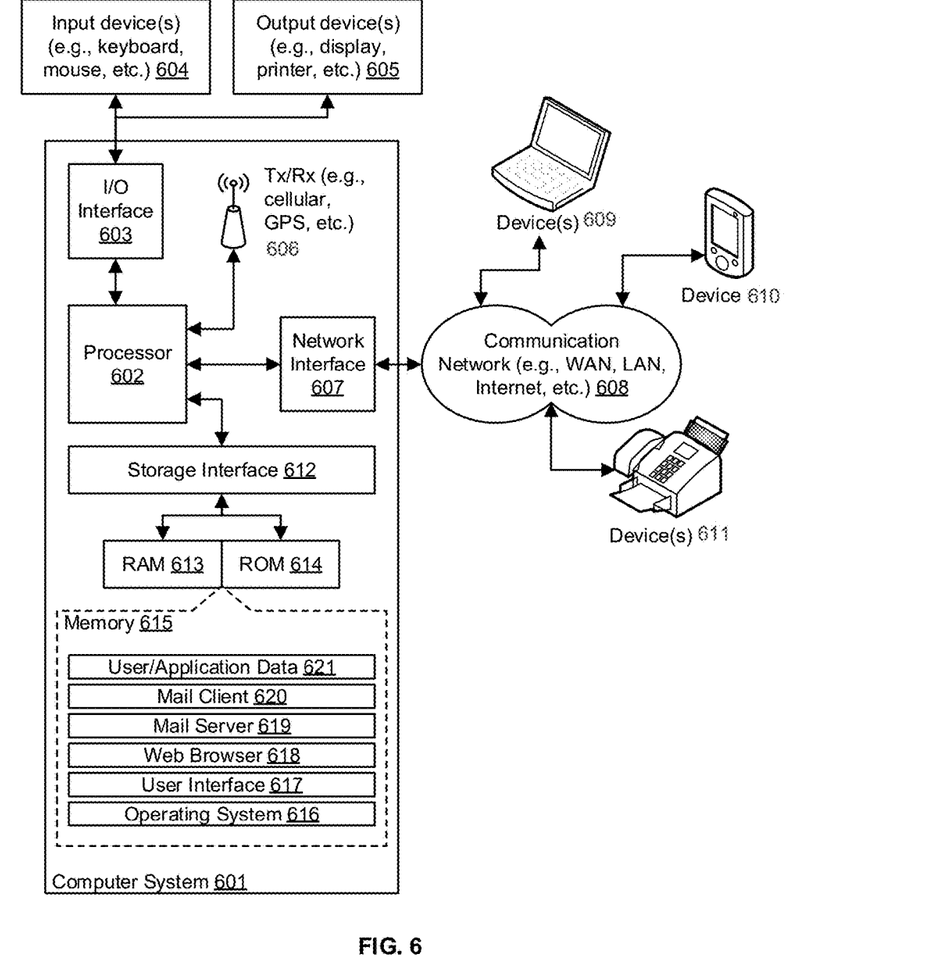
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100 for dynamically determining balance shelf life of an industrial component. Computer system 601 may comprise a central processing unit ("CPU" or "processor") 602. Processor 602 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 720, user/application data 721 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. (e.g., image data, smart tag data, statistical data, expert data, location coordinates, attributes of industrial component and working component, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide an effective and automatic solution for determining shelf life characteristics of an industrial component. The techniques enable determination of remaining shelf life of the industrial component as well as tracking of co-ordinates of the industrial component in real-time, thereby enabling robust planning of inventory. Further, the techniques described in the various embodiments discussed above enable cost saving in industrial operations due to precision planning of inventory as excess of inventory or shortage or inventory may be avoided. The determination of remaining life along with determination of inventory are made within statistical expectations without which one need to invest in huge inventory or loose the opportunity by understating the planning situation. These are the major advantages in an industrial operation as the inventory and production costs are high.

In some embodiments, the techniques described in the various embodiments discussed above is employed by an entity who holds, supplies, or rectifies these industrial components inventory so that they can control the requirement on supply side and the proper planning may be done based on the predictability of shelf life of these industrial components based on real time situations. As will be appreciated by those skilled in the art, the techniques may be integrated with existing ERP of the industrial process. Further, the techniques may be adopted across the industry such as automobile, machine building, sheet metal, consumer durable industries (e.g., watch, jewelry, etc.) for determining the balance shelf life of their respective industrial component.

The specification has described system and method for dynamically determining balance shelf life of the industrial component. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for determining balance shelf lives of industrial components, the method comprising:
analyzing, by a hardware processor, a plurality of images of an industrial component to detect a plurality of defects in the industrial component, wherein the plurality of defects comprises one or more internal defects;
determining, by the hardware processor, an overall shelf life impact of the plurality of defects based on at least one of a type of each of the plurality of defects, an extent of each of the plurality of defects with respect to the industrial component, an attribute of the industrial component, an attribute of a working component, or an operational usage of the industrial component;
mapping, by the hardware processor, a set of the plurality of images of an internal structure of the industrial component with a three-dimensional model of the industrial component;

determining, by the hardware processor, a shortest distance between an external surface of the industrial component and one of the internal defects closest to the external surface based on the mapping;

determining, by the hardware processor, a weighted shelf life impact of the one of the internal defects based on one or more of the shortest distance, a material of the industrial component, a size of the industrial component, a hardness of the industrial component, a material of the working component, or a hardness of the working component; and dynamically determining, by the hardware processor, a balance shelf life of the industrial component based on an initial expected life of the industrial component, the determined weighted shelf life impact, and the overall impact of the plurality of defects on the shelf life of the industrial component.

2. The method of claim 1, wherein one or more of the images are of an external surface of the industrial component or an internal structure of the industrial component and the method further comprises inspecting, by the hardware processor, the plurality of images to determine at least one of the type or the extent of each of the plurality of defects, wherein the type comprises at least one of an external defect or an internal defect.

3. The method of claim 1, wherein:

one or more of the plurality of defects comprises an external defect and the method further comprises determining, by the hardware processor, a weighted shelf life impact of the external defects based on an extent of external defects with respect to the industrial component, a size of the industrial component, or the operational usage of the industrial component; or the method further comprises determining, by the hardware processor, another weighted shelf life impact of the internal defects based on at least one of an extent of internal defects with respect to the industrial component, the attribute of the industrial component, the attribute of the working component, or the operational usage of the industrial component.

4. The method of claim 1, further comprising:

determining, by the hardware processor, a number of the internal defects between a centerline of the industrial component and the one of the internal defects closest to the external surface;

determining, by the hardware processor, an area encompassing the number of the internal defects; and determining, by the hardware processor, the weighted shelf life impact of the internal defects based on one or more of the number, the area, a material of the industrial component, a size of the industrial component, a hardness of the industrial component, a material of the working component, or a hardness of the working component.

5. The method of claim 1, wherein the initial expected life is determined based on a virgin life of the industrial component and a number of operational uses of the industrial component.

6. A shelf life analysis computing device comprising one or more hardware processors and a memory coupled to the one or more hardware processors which are configured to execute one or more programmed instructions comprising and stored in the memory to:

analyze a plurality of images of an industrial component to detect a plurality of defects in the industrial component wherein the plurality of defects comprises one or more internal defects;

determine an overall shelf life impact of the plurality of defects based on at least one of a type of each of the plurality of defects, an extent of each of the plurality of defects with respect to the industrial component, an attribute of the industrial component, an attribute of a working component, or an operational usage of the industrial component;

map a set of the plurality of images of an internal structure of the industrial component with a three-dimensional model of the industrial component;

determine a shortest distance between an external surface of the industrial component and one of the internal defects closest to the external surface based on the mapping;

determine a weighted shelf life impact of the one of the internal defects based on one or more of the shortest distance, a material of the industrial component, a size of the industrial component, a hardness of the industrial component, a material of the working component, or a hardness of the working component; and dynamically determine a balance shelf life of the industrial component based on an initial expected life of the industrial component, the determined weighted shelf life impact, and the overall impact of the plurality of defects on the shelf life of the industrial component.

7. The shelf life analysis computing device as set forth in claim 6, wherein one or more of the images are of an external surface of the industrial component or an internal structure of the industrial component and the one or more hardware processors are further configured to execute one or more additional programmed instructions comprising and stored in the memory to inspect the plurality of images to determine at least one of the type or the extent of each of the plurality of defects, wherein the type comprises at least one of an external defect or an internal defect.

8. The shelf life analysis computing device as set forth in claim 6, wherein:

one or more of the plurality of defects comprises an external defect and the one or more hardware processors are further configured to execute one or more additional programmed instructions comprising and stored in the memory to determine a weighted shelf life impact of the external defects based on an extent of external defects with respect to the industrial component, a size of the industrial component, or the operational usage of the industrial component; or the one or more hardware processors are further configured to execute one or more additional programmed instructions comprising and stored in the memory to determine another weighted shelf life impact of the internal defects based on at least one of an extent of internal defects with respect to the industrial component, the attribute of the industrial component, the attribute of the working component, or the operational usage of the industrial component.

9. The shelf life analysis computing device as set forth in claim 6, wherein the one or more hardware processors are further configured to execute one or more additional programmed instructions comprising and stored in the memory to:

determine a number of the internal defects between a centerline of the industrial component and the one of the internal defects closest to the external surface;

determine an area encompassing the number of the internal defects; and determine the weighted shelf life impact of the internal defects based on one or more of the number, the area, a material of the industrial component, a size of the industrial component, a hardness of the industrial component, a material of the working component, or a hardness of the working component.

10. The shelf life analysis computing device as set forth in claim 6, wherein the initial expected life is determined based on a virgin life of the industrial component and a number of operational uses of the industrial component.

11. A non-transitory computer readable medium comprising instructions stored thereon for determining balance shelf lives of industrial components, which when executed by one or more hardware processors, cause the one or more hardware processors to:

analyze a plurality of images of an industrial component to detect a plurality of defects in the industrial component, wherein the plurality of defects comprises one or more internal defects;

determine an overall shelf life impact of the plurality of defects based on at least one of a type of each of the plurality of defects, an extent of each of the plurality of defects with respect to the industrial component, an attribute of the industrial component, an attribute of a working component, or an operational usage of the industrial component;

map a set of the plurality of images of an internal structure of the industrial component with a three-dimensional model of the industrial component;

determine a shortest distance between an external surface of the industrial component and one of the internal defects closest to the external surface based on the mapping;

determine a weighted shelf life impact of the one of the internal defects based on one or more of the shortest distance, a material of the industrial component, a size of the industrial component, a hardness of the industrial component, a material of the working component, or a hardness of the working component; and     dynamically determine a balance shelf life of the industrial component based on an initial expected life of the industrial component, the determined weighted shelf life impact, and the overall impact of the plurality of defects on the shelf life of the industrial component.

12. The non-transitory computer readable medium as claimed in claim 11, wherein one or more of the images are of an external surface of the industrial component or an internal structure of the industrial component and the medium further comprises one or more additional programmed instructions, which when executed by the one or more hardware processors, further cause the one or more hardware processors to inspect the plurality of images to determine at least one of the type or the extent of each of the plurality of defects, wherein the type comprises at least one of an external defect or an internal defect.

13. The non-transitory computer readable medium as claimed in claim 11, wherein:

one or more of the plurality of defects comprises an external defect and the medium further comprises one or more additional programmed instructions, which when executed by the one or more hardware processors, further cause the one or more hardware processors to perform one or more additional steps comprising determining a weighted shelf life impact of the external defects based on an extent of external defects with respect to the industrial component, a size of the industrial component, or the operational usage of the industrial component; or     the medium further comprises one or more additional programmed instructions, which when executed by the one or more hardware processors, further cause the one or more hardware processors to determine another weighted shelf life impact of the internal defects based on at least one of an extent of internal defects with respect to the industrial component, the attribute of the industrial component, the attribute of the working component, or the operational usage of the industrial component.

14. The non-transitory computer readable medium as claimed in claim 11, further comprising one or more additional programmed instructions, which when executed by the one or more hardware processors, further cause the one or more hardware processors to:

determine a number of the internal defects between a centerline of the industrial component and the one of the internal defects closest to the external surface;

determine an area encompassing the number of the internal defects; and     determine the weighted shelf life impact of the internal defects based on one or more of the number, the area, a material of the industrial component, a size of the industrial component, a hardness of the industrial component, a material of the working component, or a hardness of the working component.

15. The non-transitory computer readable medium as claimed in claim 11, wherein the initial expected life is determined based on a virgin life of the industrial component and a number of operational uses of the industrial component.

* * * * *